United States Patent [19]
Vitunic

[11] Patent Number: 5,859,518
[45] Date of Patent: Jan. 12, 1999

[54] SWITCHED RELUCTANCE MOTOR CONTROLLER WITH SENSORLESS ROTOR POSITION DETECTION

[75] Inventor: Mark Vitunic, Santa Clara, Calif.

[73] Assignee: Micro Linear Corporation, San Jose, Calif.

[21] Appl. No.: 996,084

[22] Filed: Dec. 22, 1997

[51] Int. Cl.$^6$ .................................................. H02P 1/46
[52] U.S. Cl. ........................................... 318/701; 318/254
[58] Field of Search ................................. 318/701, 254, 318/439, 138, 700, 798–806

[56] References Cited

U.S. PATENT DOCUMENTS

| | | | |
|---|---|---|---|
| 3,501,664 | 3/1970 | Veillette ................................... | 318/138 |
| 3,649,845 | 3/1972 | Foch ......................................... | 307/228 |
| 3,715,920 | 2/1973 | Groberman et al. ................... | 73/194 B |
| 3,743,906 | 7/1973 | Torok ....................................... | 318/254 |
| 3,757,183 | 9/1973 | Nola ......................................... | 318/254 |
| 4,008,421 | 2/1977 | Bird ......................................... | 318/171 |
| 4,101,821 | 7/1978 | Kirby ....................................... | 323/119 |
| 4,110,672 | 8/1978 | Deplante et al. ........................ | 318/254 |
| 4,162,435 | 7/1979 | Wright .................................... | 318/138 |
| 4,223,261 | 9/1980 | White ...................................... | 318/721 |
| 4,482,961 | 11/1984 | Kilner et al. ............................ | 364/428 |
| 4,520,302 | 5/1985 | Hill et al. ................................ | 318/696 |
| 4,611,157 | 9/1986 | Miller et al. ............................ | 318/696 |
| 4,618,787 | 10/1986 | Jacksier et al. .......................... | 307/591 |
| 4,680,526 | 7/1987 | Okuyama et al. ...................... | 318/802 |
| 4,739,240 | 4/1988 | MacMinn et al. ...................... | 318/696 |
| 4,772,839 | 9/1988 | MacMinn et al. ...................... | 318/696 |
| 4,777,419 | 10/1988 | Obradovic .............................. | 318/696 |
| 4,806,880 | 2/1989 | Laws ....................................... | 331/8 |
| 4,825,132 | 4/1989 | Gritter ..................................... | 318/811 |
| 4,841,251 | 6/1989 | Hartmann et al. ...................... | 328/36 |
| 4,866,397 | 9/1989 | Kimyacioglu .......................... | 330/252 |
| 4,868,478 | 9/1989 | Hedlund et al. ........................ | 318/696 |
| 4,896,088 | 1/1990 | Jahns ....................................... | 318/696 |
| 4,896,089 | 1/1990 | Kliman et al. .......................... | 318/701 |
| 4,928,043 | 5/1990 | Plunkett .................................. | 318/254 |

(List continued on next page.)

OTHER PUBLICATIONS

Gottlieb, I. M., "Electric Motors & Control Techniques", 2nd Ed., pp. 147–149, 235–247, TAB Books, 1994.

TJE Miller, "Switched Reluctance Motors and Their Control", pp. 85–113, Magna Physics Publishing and Clarendon Press, Oxford, 1993.

*Primary Examiner*—Brian Sircus
*Attorney, Agent, or Firm*—Haverstock & Owens LLP

[57] ABSTRACT

A controller for a switched reluctance motor that does not utilize a sensor for detecting the rotational position of the rotor. The inductance of each field winding changes according to the rotational position of the rotor. The rotational position of the rotor of the motor is determined by measuring the inductance of each phase during periods when a minimum level of inductance for the phase is expected to occur. A series of voltage pulses are applied to the appropriate field winding during the appropriate period while the current produced in response to the voltage pulses is measured. The relationship between applied voltage, measured current, and time, is utilized to determine the inductance value as it decreases and then increases between positions of rotor alignment. Commutation to a next phase is performed based upon the measured inductance values. More particularly, a first voltage pulse is applied to an appropriate field winding after a commutation and a level of current induced by the voltage pulse is stored across a capacitor. Then, subsequent current levels produced by subsequent voltage pulses are compared to a predetermined threshold. The predetermined threshold ensures that the rotor is not stationary during the measurements. Once a current level exceeds the predetermined threshold, subsequent current levels are compared to the stored level. Upon a subsequent measured value which does not exceed the stored value, commutation to a next phase is performed. The number of degrees of rotation between removing the excitation voltage from a phase and alignment of the rotor with the corresponding phase is the phase advance. The phase advance is adjusted by controlling an offset value utilized for comparing the current levels to the stored value.

40 Claims, 8 Drawing Sheets

U.S. PATENT DOCUMENTS

| | | | |
|---|---|---|---|
| 4,949,364 | 8/1990 | Yukawa | 377/28 |
| 4,961,038 | 10/1990 | MacMinn | 318/696 |
| 4,962,339 | 10/1990 | Schauder | 318/798 |
| 4,962,344 | 10/1990 | Bohrer | 307/260 |
| 5,023,527 | 6/1991 | Erdman et al. | 318/254 |
| 5,032,771 | 7/1991 | Kerkman et al. | 318/52 |
| 5,051,680 | 9/1991 | Belanger | 318/701 |
| 5,066,899 | 11/1991 | Nashiki | 318/807 |
| 5,072,166 | 12/1991 | Ehsani | 318/696 |
| 5,097,190 | 3/1992 | Lyons et al. | 318/701 |
| 5,107,195 | 4/1992 | Lyons et al. | 318/701 |
| 5,111,085 | 5/1992 | Stewart | 307/603 |
| 5,111,150 | 5/1992 | Casey | 328/155 |
| 5,132,599 | 7/1992 | Kono et al. | 318/618 |
| 5,172,036 | 12/1992 | Cameron | 318/138 |
| 5,206,543 | 4/1993 | Takita et al. | 307/352 |
| 5,218,283 | 6/1993 | Wills et al. | 318/748 |
| 5,231,339 | 7/1993 | Kishimoto et al. | 318/807 |
| 5,247,237 | 9/1993 | Koyama et al. | 318/808 |
| 5,252,905 | 10/1993 | Wills et al. | 318/807 |
| 5,278,486 | 1/1994 | Kim | 318/811 |
| 5,304,911 | 4/1994 | Anderson | 318/729 |
| 5,334,923 | 8/1994 | Lorenz et al. | 318/805 |
| 5,345,160 | 9/1994 | Corniere | 318/811 |
| 5,376,866 | 12/1994 | Erdman | 318/254 |
| 5,410,188 | 4/1995 | Segaram | 327/237 |
| 5,428,285 | 6/1995 | Koyama et al. | 318/799 |
| 5,451,832 | 9/1995 | Cameron et al. | 318/375 |
| 5,689,167 | 11/1997 | Vitunic | 318/767 |

# SWITCHED RELUCTANCE MOTOR CONTROLLER WITH SENSORLESS ROTOR POSITION DETECTION

FIELD OF THE INVENTION

The invention relates to the field of controllers for switched reluctance motors. More particularly, the invention relates to a controller for a switched reluctance motor wherein a rotational position of a rotor of the motor is detected by the controller without the use of a position sensor.

BACKGROUND OF THE INVENTION

Switched reluctance motors are characterized in that torque is produced by the tendency of the rotor to align with an excited stator winding, thereby maximizing the inductance of the excited winding. Typically, both the rotor and the stator have unequal numbers of evenly spaced poles. The poles of the stator are wound with field windings, whereas, the poles of the rotor are not wound. Each pair of stator poles positioned opposite each other have field windings that are electrically coupled in series or in parallel so that both field windings are excited simultaneously, thus, comprising a phase of the motor. For producing continuous rotation in a switched reluctance motor, each phase is driven, typically by applying a DC excitation voltage, in an appropriate sequence according to the position of the rotor. This process of driving the phases in sequence is referred to as commutation.

FIGS. 1A–C illustrate a sequence of side sectional views of a switched reluctance motor during counterclockwise rotation of the rotor 10. In FIG. 1A, the rotor poles 1 and 3 are aligned with the stator 12 poles A and A' (phase A). In this position, the windings LA of phase A have a maximum value of inductance. Therefore, to move the rotor 10 into the position illustrated in FIG. 1A, phase A is driven by applying an excitation voltage across the windings LA of phase A, thereby inducing a current in the windings LA of phase A.

If phase A remains excited while the rotor 10 continues to turn past the position of alignment illustrated in FIG. 1A, however, a torque would be produced in a direction opposite the direction of rotation. To avoid this, and because the current cannot instantaneously fall to zero, the excitation voltage is preferably removed from phase A prior to the rotor 10 reaching this position of alignment illustrated in FIG. 1A. The number of degrees of rotation between removing the excitation voltage from a phase and alignment of the rotor 10 with the corresponding phase is referred to as the phase advance.

Upon removing the excitation voltage from phase A, an excitation voltage is applied to the windings LB of the stator 12 poles B and B' (phase B), thus, driving phase B. FIG. 1B illustrates the rotor 10 continuing to turn beyond alignment of the rotor 10 poles 1 and 3 with phase A and towards alignment of the rotor 10 poles 2 and 4 with phase B. Prior to reaching alignment with phase B, as illustrated in FIG. 1C, the excitation voltage is removed from phase B and an excitation voltage is applied to the windings LC of the stator 12 poles C and C' (phase C). Note that as illustrated in FIG. 1C, the inductance of the windings LB of phase B is at a maximum value. Prior to the alignment of the rotor 10 poles 1 and 3 with phase C, the excitation voltage is removed from phase C and an excitation voltage is applied to phase A. This commutation process continues, thereby maintaining continuous rotation of the rotor 10.

Switched reluctance motors, such as the one illustrated in FIGS. 1A–C, differ from brushless DC motors in that switched reluctance motors do not utilize permanent magnets. The use of permanent magnets in the rotor of a typical brushless DC motor tends to increase production costs and can lead to operational problems should the magnets loosen or vibrate. In contrast, the rotor of a switched reluctance motor can be relatively inexpensively manufactured from stamped sheet laminations. In addition, each field winding of a switched reluctance motor is driven independently of the other field windings, whereas, the field windings of a brushless DC motor typically share common terminals, being connected in a delta or wye configuration.

Switched reluctance motors differ from AC induction motors in that AC induction motors generally include field windings in the rotor which tend to increase the cost of producing AC induction motors. As noted above, switched reluctance motors do not have rotor windings.

While switched reluctance motors have relatively low production costs in comparison to other types of motors, they tend to be difficult to control, requiring complicated driving circuitry. This is because the relationships between torque, field current, speed, and optimal phase advance tend to be highly non-linear and also tend to vary with the load.

For driving a switched reluctance motor, knowledge of the rotor position is generally required for appropriately commutating the motor. In prior systems, the rotor position has been determined by position sensors mounted to the rotor shaft. For example, the use of encoders, Hall effect sensors, and sensing transformers are known. These sensors can increase the cost and complexity of such a system and reduce its reliability.

Sensorless control circuits have been developed for switched reluctance motors. For example, U.S. Pat. No. 5,097,190, entitled, "Rotor Position Estimator For A Switched Reluctance Machine," measures phase flux and phase current to derive rotor angle estimates. This system, however, utilizes complex circuitry in that it requires a microprocessor or a pair of analog-to-digital converters and a look-up table to estimate the rotor position.

U.S. Pat. No. 4,520,302, discloses a drive circuit for a stepping motor. Current through a phase winding that is next in sequence to be driven is allowed to increase for fixed period of time determined by a clock pulse length. Rotor position is detected by comparing a value of current attained at the end of this fixed period of time to a preset value. The preset value is set by adjusting a potentiometer. When the preset value is exceeded, the phase is energized. This technique has a disadvantage in that the current at the end of the fixed period of time must be increasing for each successive clock pulse. The inductance of a phase winding that is about to be energized, however, can also decrease while the previous phase is still being driven. Thus, additional complexity is required in the drive circuit for determining whether the inductance is increasing or decreasing. Another disadvantage of this technique is that the preset value must be calibrated before the motor can be driven. Thus, variations in the observed current values, such as those caused by variations in applied motor voltage, drive current, load and variations in winding values from phase-to-phase, will result in each commutation occurring at various times relative to rotor position.

U.S. Pat. No. 4,868,478, discloses an energizing system for a switched-type reluctance motor. High frequency pulses of short duration are fed to power transistors in the energizing circuit of that phase winding which is next in line for excitation. Commutation to the next phase is performed by comparing observed values to a preset value, similarly to U.S. Pat. No. 4,520,302, described above. U.S. Pat. No. 4,868,478, however discloses that a correction factor is calculated in an attempt to account for variations in the applied motor voltage, drive current and load. Accordingly, this technique does not overcome all the limitations of U.S. Pat. No. 4,520,302. In addition, the expense and complexity of the system disclosed by U.S. Pat. No. 4,868,478, is increased by its suggested use of a microprocessor.

Despite the advantages of switched reluctance motors, the difficulties encountered in controlling these motors has resulted in their not being as widely utilized as they might otherwise be. Therefore, what is needed is an improved circuit for controlling a switched reluctance motor and that does not require use of a rotor position sensor.

SUMMARY OF THE INVENTION

The invention is a controller for a switched reluctance motor that does not utilize a sensor for detecting the rotational position of the rotor. Each pair of stator poles positioned opposite each other have field windings that are electrically coupled in series or in parallel so that both field windings are excited simultaneously, thus, comprising a phase of the motor. For producing continuous rotation in the switched reluctance motor, each phase is driven by applying an excitation voltage in an appropriate sequence according to the position of the rotor. The rotor tends to align with an excited phase. When poles of the rotor are aligned with poles of the stator, the inductance of the windings of the aligned stator poles reach a maximum value. Prior to a period during which a phase is excited, the inductance of the windings of the phase falls to a minimum value before increasing. In a three phase motor, this minimum value for a phase occurs when the rotor is midway between positions of alignment of the remaining two phases.

The rotational position of the rotor of the motor is determined by measuring the inductance of each phase during periods when the minimum level of inductance for the phase is expected to occur. This is accomplished by applying a series of voltage pulses to the appropriate field winding during the appropriate period while current levels produced in response to the voltage pulses are measured. The relationship between applied voltage, measured current, and time, is utilized to determine the inductance value as it decreases and then increases between positions of rotor alignment. Commutation to a next phase is performed based upon the observed inductance value. More particularly, a first voltage pulse is applied to an appropriate field winding after a commutation. A level of current induced by the first voltage pulse is stored across a capacitor. Subsequently, additional voltage pulses are applied which induce additional current levels. These current levels are compared to a predetermined threshold. Once a current level exceeds the predetermined threshold, subsequent current levels are compared to the stored level. Upon a subsequent current level which does not exceed the stored level, commutation to a next phase is performed. Waiting until after the predetermined threshold is exceeded before performing a commutation prevents the motor from being commutated inappropriately in the event that the rotor is stationary or moving slowly.

The number of degrees of rotation between removing the excitation voltage from a phase and alignment of the rotor with the corresponding phase is the phase advance. The phase advance is adjusted by controlling an offset value utilized for comparing the subsequent current levels to the stored value. The offset value is preferably controlled to be proportional to the speed of rotation of the rotor.

DETAILED DESCRIPTION OF A PREFERRED EMBODIMENT

Figure 1A:
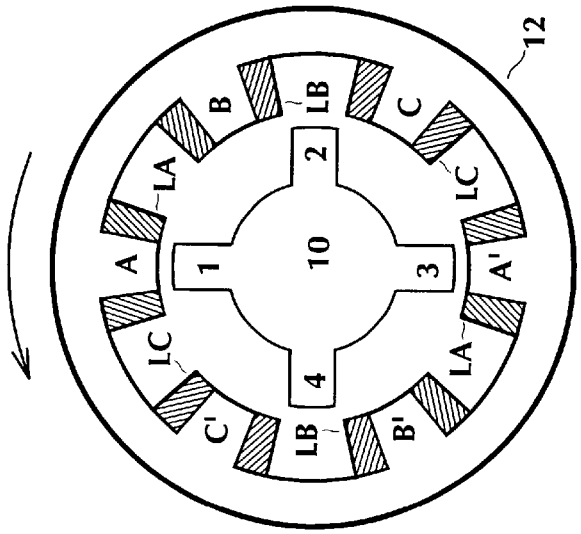
FIGS. 1A–C illustrate a sequence of side sectional views of a switched reluctance motor during counterclockwise rotation of the rotor.
Figure 1B:
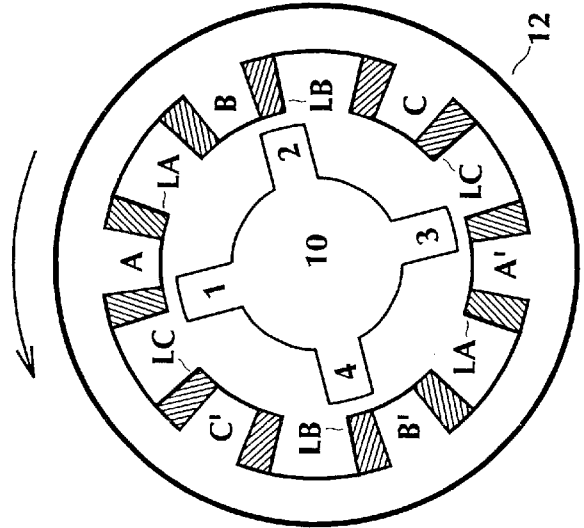
Figure 1C:
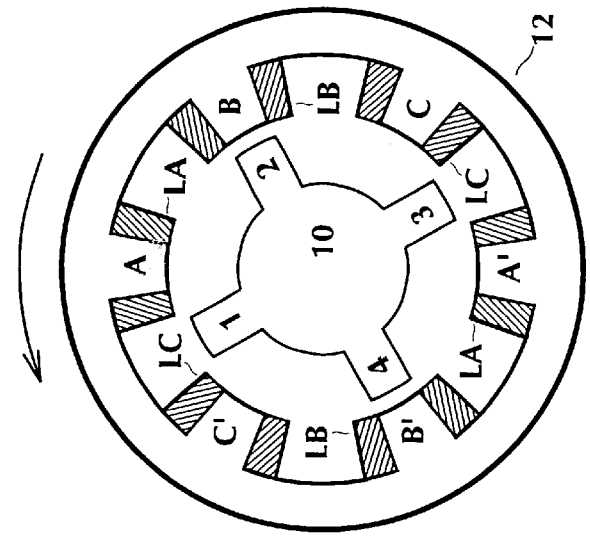
Figure 2:
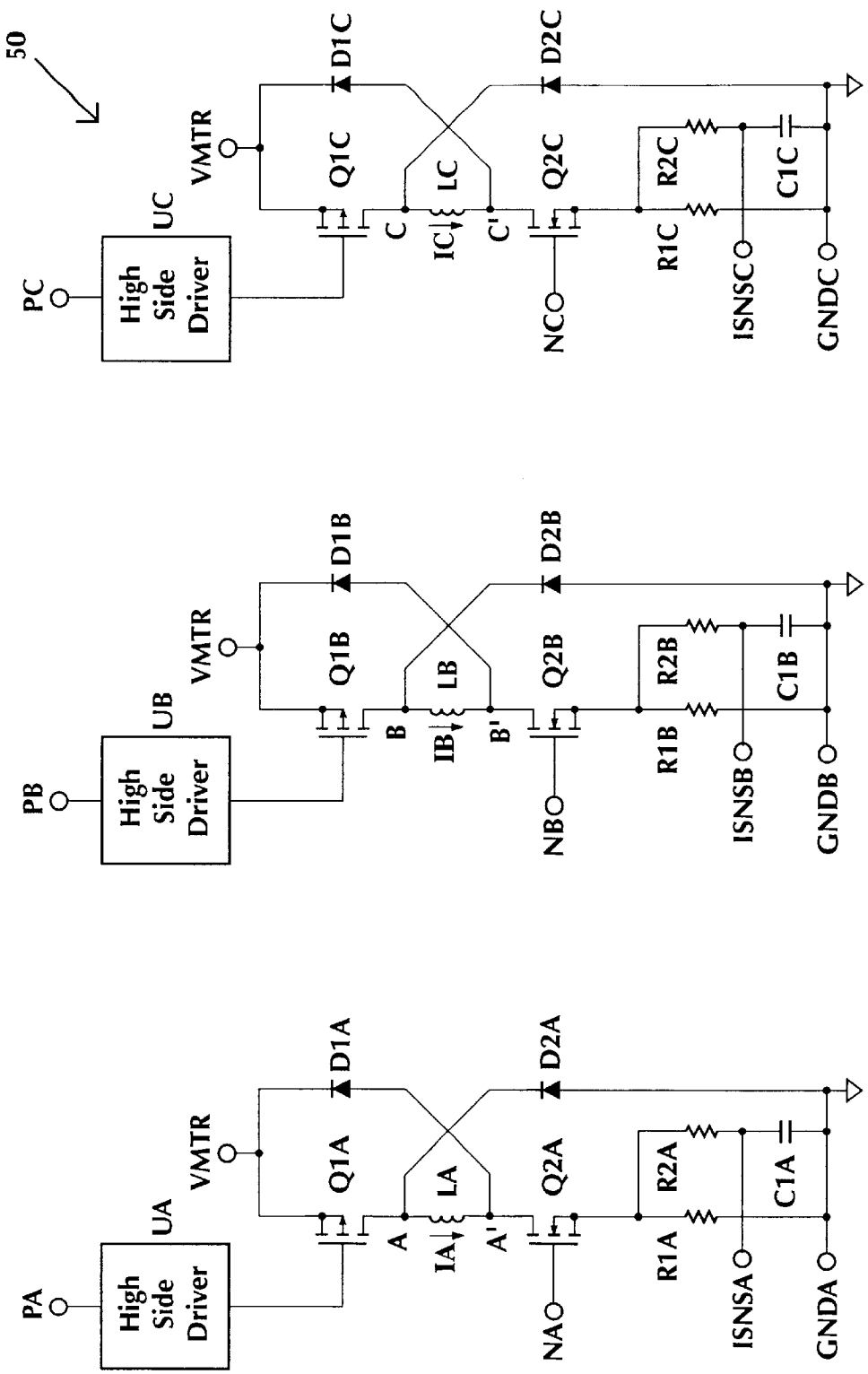
FIG. 2 illustrates a power inverter according to the present invention for driving a switched reluctance motor.

FIG. 2 illustrates a power inverter 50 according to the present invention for driving a three-phase switched reluctance motor. A supply voltage VMTR is coupled to a source of a PMOSFET Q1A and to a cathode of a diode D1A. A control terminal PA is coupled to an input terminal of a high side driver UA. An output terminal of the high side driver UA is coupled to a gate of the transistor Q1A. A drain of the transistor Q1A is coupled to a first terminal of a field winding LA (around the poles A and A') of the motor and to a cathode of a diode D2A. A second terminal of the field winding LA is coupled to a drain of an NMOSFET Q2A and to an anode of the diode D1A. A control terminal NA is coupled to a gate of the transistor Q2A. A source of the transistor Q2A is coupled to a first terminal of a resistor R1A and to a first terminal of a resistor R2A. A second terminal of the resistor R2A is coupled to a first terminal of a capacitor C1A and to a current sense terminal ISNSA. A second terminal of the capacitor C1A, a second terminal of the resistor R1A and an anode of the diode D2A are coupled to a ground node GNDA.

The supply voltage VMTR is also coupled to a source of a PMOSFET Q1B and to a cathode of a diode D1B. A control terminal PB is coupled to an input terminal of a high side driver UB. An output terminal of the high side driver UB is coupled to a gate of the transistor Q1B. A drain of the transistor Q1B is coupled to a first terminal of a field winding LB (around the poles B and B') of the motor and to a cathode of a diode D2B. A second terminal of the field winding LB is coupled to a drain of an NMOSFET Q2B and to an anode of the diode D1B. A control terminal NB is coupled to a gate of the transistor Q2B. A source of the transistor Q2B is coupled to a first terminal of a resistor R1B and to a first terminal of a resistor R2B. A second terminal of the resistor R2B is coupled to a first terminal of a capacitor C1B and to a current sense terminal ISNSB. A second terminal of the capacitor C1B, a second terminal of the resistor R1B and an anode of the diode D2B are also coupled to a ground node GNDB.

The supply voltage VMTR is also coupled to a source of a PMOSFET Q1C and to a cathode of a diode D1C. A control terminal PC is coupled to an input terminal of a high side driver UC. An output terminal of the high side driver UC is coupled to a gate of the transistor Q1C. A drain of the transistor Q1C is coupled to a first terminal of a field winding LC (around the poles C and C') of the motor and to a cathode of a diode D2C. A second terminal of the field winding LC is coupled to a drain of an NMOSFET Q2C and to an anode of the diode D1C. A control terminal NC is coupled to a gate of the transistor Q2C. A source of the transistor Q2C is coupled to a first terminal of a resistor R1C and to a first terminal of a resistor R2C. A second terminal of the resistor R2C is coupled to a first terminal of a capacitor C1C and to a current sense terminal ISNSC. A second terminal of the capacitor C1C, a second terminal of the resistor R1C and an anode of the diode D2C are also coupled to a ground node GNDC.

To apply an excitation voltage to phase A of the switched reluctance motor, the transistors Q1A and Q2A are turned on by applying a logical high voltage to each of the control terminals PA and NA. The high side driver UA converts the logical high voltage applied to the terminal PA into a low level suitable for driving the transistor Q1A in saturation. When the transistors Q1A and Q2A are turned on, the voltage supply VMTR is effectively coupled across the field winding LA. In response, a current IA through the field winding LA ramps up.

FIGS. 3A–C illustrate current waveforms for driving a switched reluctance motor and for sensing rotor position versus time during rotation of the motor. Excitation of phase A is illustrated in FIG. 3A where the current IA is shown to begin ramping up before alignment of the rotor with Phase C at time t1. FIG. 3A illustrates that in a drive phase, the current IA ramps up to a terminal value T. The terminal value T for IA depends upon the level of the voltage VMTR and upon the on-resistance of the transistors Q1A and Q2A, the resistance of the field windings LA and the value of the resistor R1A. The ramp-up time for IA also depends upon the inductance of the field windings LA. As explained herein, however, the voltage applied during the drive phase can be modulated for controlling the speed of the motor. In which case, the IA can follow a different curve during the drive phase.

Figure 3:
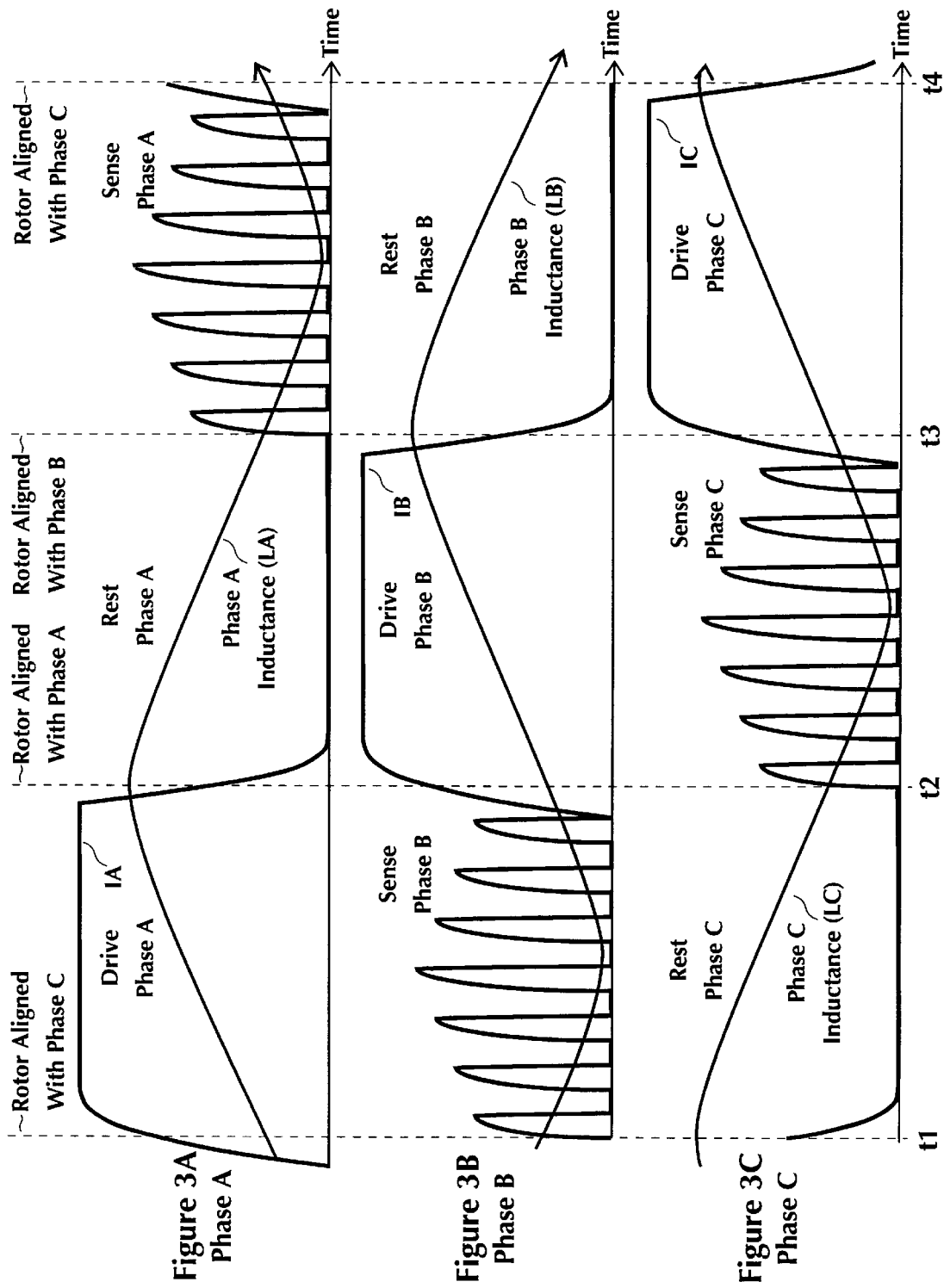
FIGS. 3A–C illustrate current waveforms according to the present invention for driving a switched reluctance motor and for sensing rotor position versus time during rotation of the motor.

As illustrated in FIG. 3, alignment of the rotor with phase C occurs at the time t1. The current in phase A preferably begins ramping up prior to the time t1 by an amount of time which depends upon the amount of phase advance. Applying the excitation voltage to phase A at the appropriate time tends to cause the rotor to continue rotation so as to align with phase A. Alignment of the rotor with phase A coincides with the time t2 illustrated in FIG. 3. Note that as the rotor approaches alignment with phase A, the inductance of the field winding LA increases until reaching a maximum value at the time t2 when the rotor is aligned with phase A. Then, the inductance of field winding LA decreases during a rest phase A.

To remove the excitation voltage from phase A, the transistors Q1A and Q2A are turned off by applying a logical low voltage to the terminals PA and NA. The diodes D1A and D2A (FIG. 2) are provided for shunting the current IA which is stored in the field winding LA to the supply voltage VMTR. Because the current IA cannot instantaneously fall to zero, the excitation voltage is preferably removed from phase A prior to the time t2, as illustrated in FIG. 3A by the current IA beginning to ramp down prior to the time t2. The amount of time prior to t2 that the excitation voltage is removed preferably also depends upon the phase advance.

At approximately the same time that the excitation voltage is removed from phase A, an excitation voltage is applied to phase B by applying a logical high voltage to the terminals PB and NB. In response, a current IB through the field winding LB ramps up. This excitation of phase B is illustrated in FIG. 3B where the current IB is shown ramping up to a terminal value T. Applying the excitation voltage to phase B at the appropriate time tends to cause the rotor to align with phase B. Alignment of the rotor with phase B coincides with the time t3 illustrated in FIG. 3. Accordingly, the excitation voltage is preferably removed from phase B prior to the time t3, as illustrated in FIG. 3B by the current IB ramping down. Note that as the rotor moves into alignment with phase B, the inductance of the winding LB is increasing until it reaches a maximum value at the time t3 when the rotor is aligned with phase B. Then, the inductance of field winding LB decreases during a rest phase B.

At approximately the same time that the excitation voltage is removed from phase B, an excitation voltage is applied to phase C by applying a logical high voltage to the terminals PC and NC. In response, a current IC through the field winding LC ramps up. This excitation of phase C is illustrated in FIG. 3C where the current IC is shown ramping up to a terminal value T. Applying the excitation voltage to phase C at the appropriate time tends to cause the rotor to align with phase C. Alignment of the rotor with phase C coincides with the time t4 illustrated in FIG. 3. Accordingly, the excitation voltage is preferably removed from phase C prior to the time t4, as illustrated in FIG. 3C by the current IC ramping down. Note that as the rotor moves into alignment with phase C, the inductance of the winding LC is increasing until it reaches a maximum value at the time t4 when the rotor is aligned with phase C. Then, the inductance of field winding LC decreases during a rest phase C. This sequence of commutating each phase occurs in sequence at appropriate times for producing continuous rotation of the motor.

As illustrated in FIG. 3A, the inductance of the phase A reaches maximum level at the time t2 when the rotor is aligned with phase A. The inductance of phase A reaches a minimum level when the rotor is midway between alignment with phase B and with phase C. Also, as illustrated in FIG. 3B, the inductance of the phase B reaches a maximum level at the time t3 when the rotor is aligned with phase B. The inductance of phase B reaches a minimum level when the rotor is midway between alignment with phase C and with phase A. And, as illustrated in FIG. 3C, the inductance of phase C reaches a maximum level at the times t1 and t4, when the rotor is in alignment with phase C. (Note that due to the repetitive nature of the commutations of the windings of this motor, times t1 and t4 are essentially the same.) The inductance of phase C reaches a minimum level when the rotor is midway between alignment with phase A and with phase B. Note that waveforms of the inductance values illustrated in FIG. 3 are typical and that the precise waveforms will depend upon the parameters of the particular switched reluctance motor being driven.

The present invention determines the position of the rotor of the motor by measuring the inductance of each phase of the motor during periods when the minimum level of inductance for the phase is expected to occur. This is accomplished by applying a series of voltage pulses to the appropriate field winding during a sense phase and measuring the current produced in response to the voltage pulses. The relationship between applied voltage, measured current, and time, is utilized to determine the inductance value as it decreases and then increases between positions of rotor alignment. Commutation to a next phase is performed based upon the observed inductance value.

More particularly, a current level value dependent upon the inductance value is measured and stored after a commutation which occurs near in time to a position of alignment of the rotor. Then, subsequent measured current level values are compared to the stored value. Upon a subsequent measured current level value not exceeding the stored level, commutation to a next phase is performed. Because the stored value and the subsequent measured current level values are all observed values, no calibration is required. This is in contrast to prior systems, such as those disclosed in U.S. Pat. Nos. 4,520,302 and 4,868,478, which make the decision of when to commutate based upon a comparison of a measured value to a fixed value. In such a prior system, calibration of the fixed value is required for the system to operate.

Preferably, though not necessarily, before a commutation is performed, a measured current level value must rise above a predetermined threshold in addition to not exceeding the stored value. Waiting until after the measured current level value rises above the predetermined threshold before performing a commutation prevents the motor from being commutated inappropriately in the event that the rotor is stationary or moving slowly. Though the predetermined threshold must be calibrated, its precise value does not affect commutation so long as it falls within an appropriate range between the measured value and a maximum value attainable when the inductance of the winding is at a minimum.

The current IA is measured by forming a voltage across the resistor R1A (FIG. 2) which is sensed via the terminal ISNSA. The resistor R2A and the capacitor C1A form a low pass filter for filtering transients from the sensing signal formed at the terminal ISNSA. Similarly, currents IB and IC are low pass filtered and sensed via terminals ISNSB and ISNSC, respectively.

The sense phase for measuring of the inductance of the field windings LA begins after the motor is commutated so as to begin driving phase C (at approximately the time t3 illustrated in FIG. 3). A logical high voltage is applied to the control terminals PA and NA (FIG. 2) in pulses, each pulse lasting a predetermined period of time. Alternately, one or the other of the terminals PA and NA can be held at a logical high voltage while the other of the terminals is pulsed. In either case, the transistors Q1A and Q2A are both on for the predetermined period of time, coupling the supply voltage VMTR across the field winding LA of phase A. In response, the current IA in the field winding LA ramps up. The amount of time that the supply voltage VMTR is applied to the phase A for each pulse during the sense phase A is shorter than the amount of time required for the current IA to reach a terminal value T during the drive phase A, thus, forming a series of current spikes. The height reached by of each of the spikes in the current IA, as measured a predetermined amount of time after applying a voltage pulse, is representative of the inductance of the field winding LA during the corresponding voltage pulse. By applying a series of logical high voltage pulses of fixed duration to the control terminals PA and NA, a series of current spikes are produced in the field winding LA, as illustrated in FIG. 3A. Each current spike has an amplitude that is inversely related to the inductance of the field winding LA during the corresponding interval. The amplitudes of the current spikes are utilized to determine the rotational position of the rotor and, thus, the amplitudes of the current spikes are utilized to determine when to commutate so as to begin driving phase A. During periods when the phase A is neither being driven, nor utilized to sense the rotor position, the phase A is in a rest period A.

Similarly, measurement of the inductance of the field windings LB of phase B is performed after the rotor is commutated so as to begin the drive phase A (at approximately the time t1 illustrated in FIG. 3). By applying a series of logical high voltage pulses of fixed duration to the control terminals PB and NB, a series of current spikes are produced in the field winding LB, as illustrated in FIG. 3B. Each current spike has an amplitude that is inversely related to the inductance of the field winding LB during the corresponding interval. Therefore, the amplitudes of the current spikes can be used to determine the rotational position of the rotor and, thus, the amplitudes of the current spikes are utilized to determine when to commutate so as to begin driving phase B.

Similarly, measurement of the inductance of the field windings LC of phase C is performed after the motor is commutated so as to begin the drive phase B (at approximately the time t2 illustrated in FIG. 3). By applying a series of logical high voltage pulses of fixed duration to the control terminals PC and NC, a series of current spikes are produced in the field winding LC, as illustrated in FIG. 3C. Each current spike has an amplitude that is inversely related to the inductance of the field winding LC during the corresponding interval. Therefore, the amplitudes of the induced current spikes can be used to determine the rotational position of the rotor and, thus, the amplitudes of the current spikes are utilized to determine when to commutate so as to begin the drive phase C.

Preferably, the duration of the current spikes are selected to avoid producing a significant amount of torque on the rotor, but also to have sufficient amplitude so as to provide sufficient accuracy in measurement. Further, the frequency at which the current spikes are induced determines the number of spikes which occur during each sense phase for a particular motor speed. A certain minimum number of current spikes are required for each sense phase to reliably determine the position of the rotor. Thus, the frequency at which the current spikes are induced is expected to determine the maximum motor speed.

Figure 4:
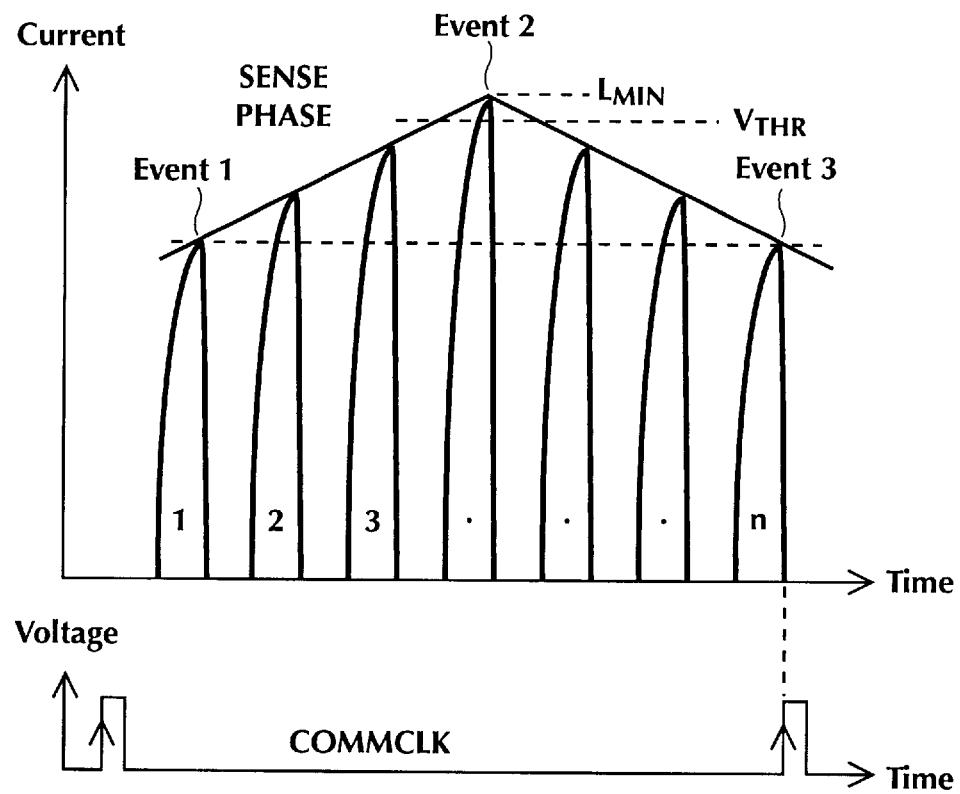
FIG. 4 illustrates how the current spikes induced in a phase are utilized to determine when to commutate so as to begin driving the phase.

FIG. 4 illustrates how the current spikes induced in a phase are utilized to determine when to commutate so as to begin driving the phase. A control signal COMMCLK is utilized to control commutation from driving a phase to driving a next phase in the sequence. After a first pulse in the control signal COMMCLK, a current spike is induced in the field winding for the appropriate phase. For example, referring to FIG. 3, if the first pulse of COMMCLK results in phase A being driven, then current pulses are induced in phase B for measuring the inductance of phase B. Note that phase B is the phase next in sequence to be driven after phase A. The amplitude of the first induced current spike is stored. This corresponds to Event 1 illustrated in FIG. 4.

After storing the amplitude of the first current spike (Event 1), additional current spikes continue to be induced in the field winding. The amplitude of each of these current spikes is compared to a predetermined threshold VTHR. Eventually, as the inductance of the field winding drops, a current spike occurs having an amplitude that exceeds the predetermined threshold VTHR. This corresponds to Event 2. After a current spike occurs having an amplitude greater than the predetermined threshold (Event 2), additional current spikes continue to be induced in the field winding. The amplitude of each of these current spikes is compared to the amplitude of the first current spike stored (during Event 1). Eventually, as the inductance of the field winding increases again, a current spike occurs having an amplitude that is lower than the amplitude of the first current spike. This corresponds to Event 3. When this occurs, the control signal COMMCLK is pulsed again, resulting in a commutation to a next phase.

Assuming the motor being driven is a three-phase motor having four rotor poles and six stator poles, the time period elapsed between the two successive pulses in the control signal COMMCLK is equal to the time required for the rotor to rotate by thirty degrees mechanical. Alternately, for a three-phase motor having eight rotor poles and twelve stator poles, the time between the two successive pulses in the control signal COMMCLK is equal to the time required for the rotor to rotate by fifteen degrees mechanical. Therefore, the frequency of the signal COMMCLK is proportional to the speed of the motor.

After the commutation, the process illustrated in FIG. 4 repeats wherein a phase is driven and the inductance of a next phase is sensed by inducing current spikes in the next phase until another commutation is performed. After each commutation, a new value of an initial current spike is stored. In the example, if the inductance of phase B is being sensed, upon a current spike occurring having an amplitude lower than the amplitude of the first current spike (Event 3), the phase B will then become the drive state and the inductance of phase C will be sensed, as illustrated in FIG. 3. Because of variations that result in typical manufacturing processes, the actual inductance of the rotor/winding systems will likely vary from phase to phase, However, because a signal proportional to the actual inductance is sensed, these variations have negligible effect on the proper operation of the motor.

The current spikes occurring after Event 1 are compared to the threshold VTHR (Event 2) to ensure that the inductance falls and then rises again due to rotation of the rotor before commutating to a next phase (Event 3). Otherwise, if Event 2 was omitted, successive spikes having approximately the same amplitude, as occurs when the rotor is stationary or moving slowly, could cause a commutation to occur at an inappropriate time due to minor variations or noise in the current spikes. In an alternate embodiment, however, Event 2 can be omitted.

The technique according to the present invention contrasts with prior systems where measured values are compared only to a fixed value to determine when to commutate the motor. In such a prior system, the fixed value must be calibrated for the system to operate. While the present invention does compare measured values to a predetermined threshold VTHR, commutation is not based only upon this comparison. Rather, according to the present invention, commutation occurs when a measured value then falls below a previously measured and stored value. Because the stored value is a prior measured value, the technique according to the present invention is self-calibrating for each commutation.

As illustrated in FIG. 4, the current spikes which occur after Event 2 are compared directly to the stored level obtained during Event 1. This results in a phase advance of approximately zero degrees. The phase advance will vary somewhat for each commutation since the current spike (at Event 3) which is below the value stored during Event 1 (resulting in a commutation) can occur when the rotor is in a slightly different rotational position for each commutation depending upon the frequency of the current spikes relative to the motor speed. These variations can be reduced by increasing the frequency at which the current spikes are induced.

A phase advance of zero degrees is generally optimum only at low motor speeds such that the currents in the field windings have sufficient time to ramp down, thus, inducing only a small amount of torque in the direction opposite the direction of rotation of the rotor. At higher speeds, the phase advance should generally be adjusted to ensure that the currents in the field windings have ramped down sufficiently so as to avoid inducing a significant amount of torque in the direction opposite rotation.

Figure 5:
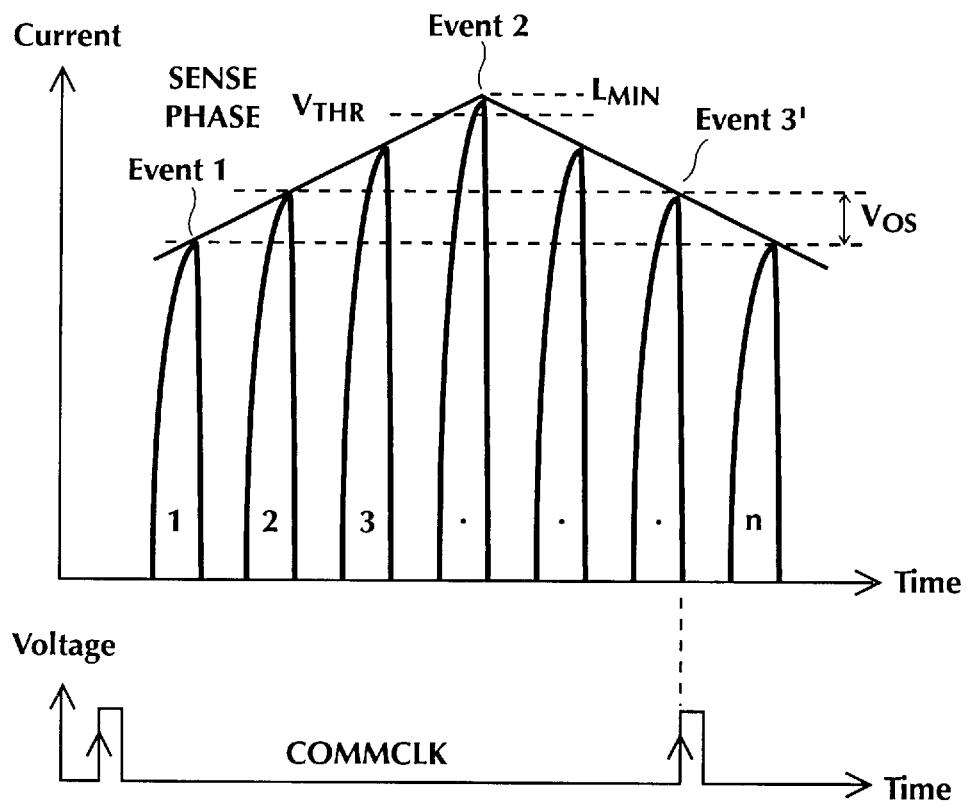
FIG. 5 illustrates how the current spikes induced in a phase are utilized to determine when to commutate so as to begin driving the phase according to an adjustable phase advance.

FIG. 5 illustrates how the current spikes induced in a phase are utilized to determine when to commutate according to an adjustable phase advance. Upon a first pulse in the control signal COMMCLK, a current spike is induced in the field winding for the appropriate phase. The amplitude of the first current spike is stored (Event 1). After Event 1 occurs, current spikes continue to be induced in the field winding. The amplitude of each of these current spikes is compared to a predetermined threshold VTHR. Eventually, as the inductance of the field winding drops, a current spike occurs having an amplitude that exceeds this predetermined threshold (Event 2). After Event 2 occurs, current spikes continue to be induced in the field winding. The amplitude of each of these current spikes is compared to the amplitude of the first current spike stored during Event 1, as adjusted by an offset voltage Vos. The offset voltage Vos determines the amount of phase advance. Therefore, the offset voltage is preferably adjusted according to the speed of the motor. For example, the offset voltage Vos can be linearly proportional to the motor speed. Alternately, the offset voltage can have some other monotonic relationship to the motor speed.

The offset voltage Vos is effectively added to the voltage stored during Event 1 to increase the level below which a subsequent current spike must fall to trigger a commutation (Event 3'). When this occurs, the control signal COMMCLK is pulsed, resulting in a commutation to a next phase. After the commutation, the process repeats wherein the phase is driven and the inductance of a next phase is sensed by inducing current spikes until another commutation is performed.

Note that as the offset voltage Vos is increased, the amount of phase advance is also increased. Accordingly, commutations will occur earlier relative to the position of the rotor. Therefore, the inductance of the field winding being sensed will be at increasingly higher levels when the first spike is stored (Event 1). Therefore, the level of the first spike will tend to be lower as the phase advance is increased. This will tend to reduce the effect that increasing the offset voltage Vos will have on the phase advance. Thus, depending upon the parameters of the particular motor being driven, the phase advance might not have a linearly proportional relationship to motor speed despite having an offset voltage that is linearly proportional to the motor speed. It is expected, however, that this will not result in significant adverse effects.

Figure 6:
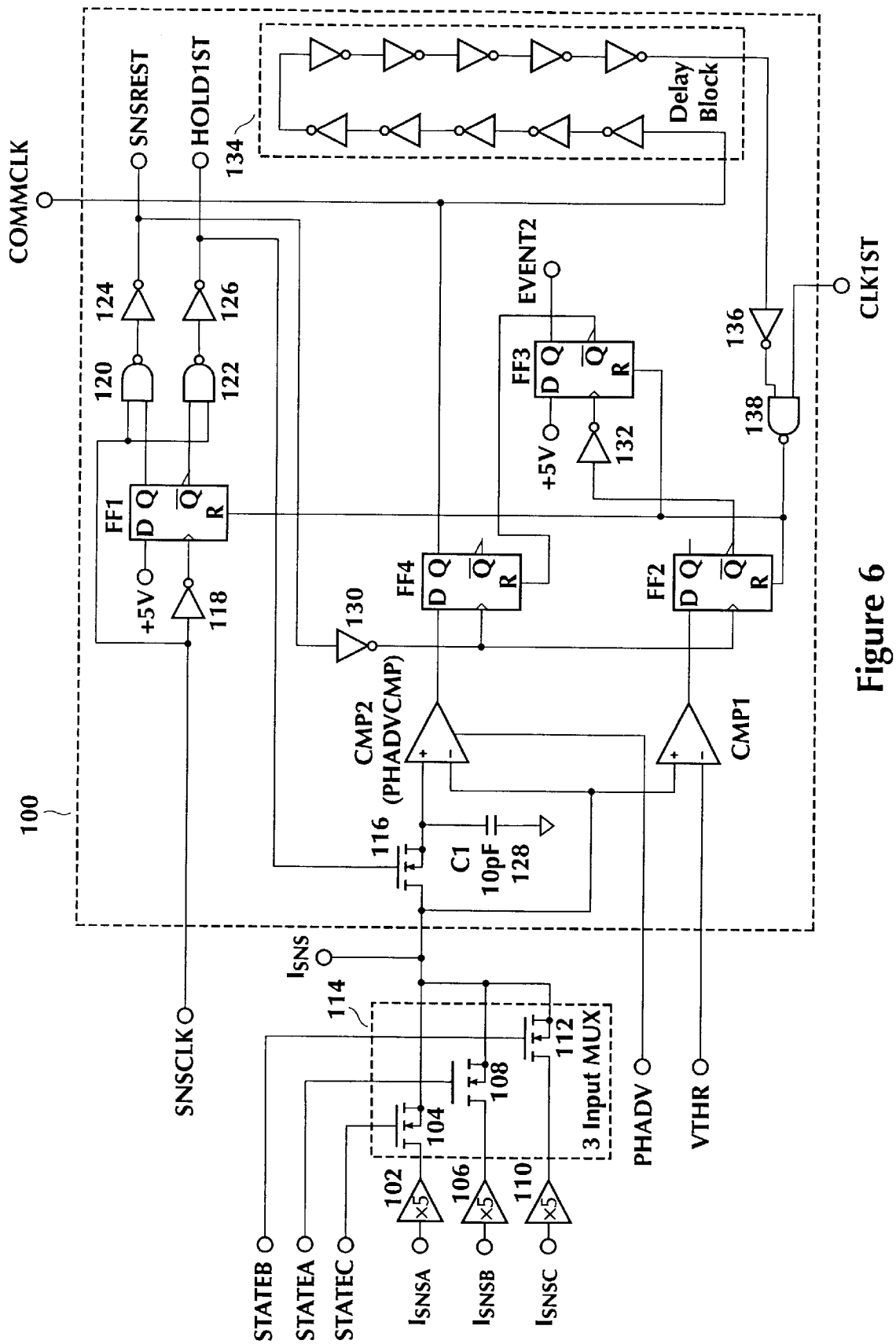
FIG. 6 illustrates a schematic block diagram of a circuit for sensing the position of the rotor and for initiating commutation of the motor at appropriate times according to the position of the rotor.

FIG. 6 illustrates a schematic block diagram of a circuit 100 for sensing the position of the rotor and for initiating commutation of the motor at appropriate times according to the position of the rotor. The terminal ISNSA (FIG. 2) is coupled to an input of an amplifier 102. An output of the amplifier 102 is coupled to a drain of an NMOSFET 104.

The terminal ISNSB (FIG. 2) is coupled to an input of an amplifier 106. An output of the amplifier 106 is coupled to a drain of an NMOSFET 108. The terminal ISNSC (FIG. 2) is coupled to an input of an amplifier 110. An output of the amplifier 110 is coupled to a drain of an NMOSFET 112. In this embodiment, each of the amplifiers 102, 106 and 110 provides amplification by a factor of five.

Together, the transistors 104, 108 and 112 form a three-input multiplexer 114. A control terminal STATE A is coupled to a gate of the transistor 108. A control terminal STATE B is coupled to a gate of the transistor 112. A control terminal STATE C is coupled to a gate of the transistor 104. A source of the transistor 104 is coupled to a source of the transistor 108, to a source of the transistor 112, to a terminal ISNS, to a drain of an NMOSFET 116, to a non-inverting input of a comparator CMP1 and to an inverting input of a comparator CMP2. An inverting input of the comparator CMP1 is coupled to a terminal VTHR.

A terminal SNSCLK is coupled to an input of a logical inverter 118, to a first input of a logical NAND gate 120 and to a first input of a logical NAND gate 122. An output of the inverter 118 is coupled to a clock input C of a flip-flop FF1. A data input D of the flip-flop FF1 is coupled to receive a logical high voltage. A Q output of the flip-flop FF1 is coupled to a second input of the logical NAND gate 120. A $\overline{Q}$ output of the flip-flop FF1 is coupled to a second input of the logical NAND gate 122. An output of the NAND gate 120 is coupled to an input of a logical inverter 124. An output of the NAND gate 122 is coupled to an input of a logical inverter 126. An output of the inverter 126 is coupled to a terminal HOLD1ST and to a gate of the transistor 116.

A source of the transistor 116 is coupled to a first terminal of a capacitor 128 and to a non-inverting input of the comparator CMP2. A second terminal of the capacitor 128 is coupled to a ground node. An offset input of the comparator CMP2 is coupled to a phase advance terminal PHADV. An output of the comparator CMP2 is coupled to a data input of a flip-flop FF4. An output of the comparator CMP1 is coupled to a data input of a flip-flop FF2. An output of the inverter 124 is coupled to a terminal SNSREST and to an input of a logical inverter 130. An output of the inverter 130 is coupled to a clock input C of the flip-flop FF2 and to a clock input C of the flip-flop FF4. A $\overline{Q}$ output of the flip-flop FF2 is coupled to an input of a logical inverter 132. An output of the inverter 132 is coupled to a clock input C of a flip-flop FF3.

A data input D of the flip-flop FF3 is coupled to receive a logical high voltage. A Q output of the flip-flop FF3 is coupled to a terminal EVENT2. A $\overline{Q}$ output of the flip-flop FF3 is coupled to a reset input R of the flip-flop FF4. A Q output of the flip-flop FF4 is coupled to a terminal COMMCLK and to an input of a delay block 134. The delay block 134 is preferably formed of an even number, in this case ten, of series coupled logical inverters. An output of the delay block 134 is coupled to an input of a logical inverter 136. An output of the inverter 136 is coupled to a first input of a logical NAND gate 138. A second input of the NAND gate 138 is coupled to a terminal CLK1ST. An output of the NAND gate 138 is coupled to a reset input R of the flip-flop FF1, to a reset input R of the flip-flop FF2 and to a reset input R of the flip-flop FF3.

Terminals STATE A, STATE B and STATE C are configured to be a logical high voltage according to the motor phase that is being driven. For example, if phase A is being driven, STATE A is a logical high voltage. This turns on the transistor 108 which couples the signal ISNSB to the terminal ISNS via the amplifier 106. Thus, referring to FIG. 3, when phase A is being driven, phase B is selected to be sensed by the multiplexer 114. Similarly, when phase B is being driven, phase C is being sensed and, when phase C is being driven, phase A is being sensed.

The terminal SNSCLK is coupled to receive a clock signal SNSCLK. The clock signal SNSCLK has a logical high voltage coincident with current pulses induced in each phase while the inductance of the phase is being sensed and a logical low voltage during intervals between the induced current pulses.

Upon a commutation of the motor, the signal COMMCLK is pulsed, as illustrated in FIGS. 4 and 5. The signal COMMCLK is applied to a finite state machine 202 (FIG. 7) for initiating a commutation of the motor and to the delay block 134. The output signal from the delay block 134 (FIG. 6) is combined with a signal at the terminal CLK1ST by the NAND gate 138. The terminal CLK1ST is coupled to receive a signal CLK1ST that is a logical low voltage initially, when the rotor position is unknown, then transitions to a logical high voltage after the rotor is in an initial state of pole pair alignment. The signal CLK1ST remains logical high indefinitely after this initial transition from low to high. Techniques of bringing the motor into an initial state of pole-pair alignment, such as forcing a DC current in a given state for a sufficient long period of time, are well known in the art.

Thus, after the signal COMMCLK is pulsed, the flip-flops FF1, FF2 and FF3 are reset by a logical high voltage pulse. When FF3 is in the reset state, the $\overline{Q}$ output of the flip-flop FF3 holds the flip-flop FF4 in the reset state. Therefore, when the signal COMMCLK is a logical high voltage, the signal COMMCLK serves to reset the flip-flop FF4, thus, returning the signal COMMCLK to a logical low voltage. The delay block 134 ensures that all the flip-flops FF1, FF2, FF3 and FF4, are not reset immediately, driving COMMCLK low, before the signal COMMCLK attains a logical high voltage.

Upon being reset, the $\overline{Q}$ output of the flip-flop FF1 is a logical high voltage. This logical high voltage is combined by the NAND gate 122 with a logical high voltage of the signal SNSCLK while the first current spike is being induced. Accordingly, the terminal HOLD1ST is a logical high voltage during the first induced current spike which occurs after a commutation. Therefore, the transistor 116 is turned on, allowing a voltage representative of the amplitude of the first current spike to be applied across the capacitor 128. Then, upon the termination of the induced current pulse, the terminal HOLD1ST becomes a logical low voltage by the flip-flop FF1 being set after the pulse applied to the reset inputs of the flip-flops FF1, FF2 and FF3 is removed. Thus, a voltage representative of the maximum amplitude of the first current pulse is stored across the capacitor 128. This corresponds to Event 1 illustrated in FIGS. 4 and 5.

Though the pulse applied to the reset inputs of the flip-flops FF1, FF2 and FF3 is removed, the flip-flop FF4 remains reset by the $\overline{Q}$ output of the flip-flop FF3. The Q output of the flip-flop FF1 is a logical high voltage which allows the clock signal SNSCLK to be applied to the clock inputs of the flip-flops FF2 and FF4. The clock signal SNSCLK prevents the states of the flip-flip flops FF2 and FF4 from being affected by the outputs of the comparators CMP1 and CMP2, respectively, except at the appropriate times during induced current spikes. The appropriate time for comparing each current spike is a predetermined time interval after beginning inducement of the current spike. Accordingly, the relative amplitudes of the current spikes when they are compared by the comparators CMP1 and CMP2 are representative of the relative inductance levels of the field winding being sensed.

Then, the comparator CMP1 monitors subsequent current spikes. Eventually, as the inductance of the motor phase being sensed falls, a current pulse will have an amplitude that exceeds the threshold voltage VTHR. This causes the output of the comparator CMP1 to change from a logical low voltage to a logical high voltage, coincident with the flip-flop FF2 being clocked. In response, the $\overline{Q}$ output of the flip-flop FF2 changes from a logical high voltage to a logical low voltage which, in turn, causes the $\overline{Q}$ output of the flip-flop FF3 to change from a logical high voltage to a logical low voltage. This removes the logical high voltage applied to the reset terminal of the flip-flop FF4. Removing the logical high voltage from the reset input R of the flip-flip FF4 enables the flip-flop FF4 to change states according to the output of the comparator CMP2. This corresponds to Event 2 illustrated in FIGS. 4 and 5.

The comparator CMP2 monitors subsequent current spikes. A voltage Vos representative of a desired amount of phase advance is applied to a PHADV terminal of the comparator CMP2. This provides an offset for changing the logic level of the output of the comparator CMP2. Eventually, as the inductance of the motor phase being sensed increases, the amplitude of an induced current spike will fall below the level stored on the capacitor 128, as adjusted by the offset voltage Vos. The output of the comparator CMP2 will then be a logical high voltage coincident with the flip-flop FF4 being clocked. This causes the Q output of the flip-flop FF4 and, thus, the signal COMMCLK to change from a logical low voltage to a logical high voltage. This corresponds to Events 3 and 3' illustrated in FIGS. 4 and 5, respectively. This process repeats for each phase of the motor.

Figure 7:
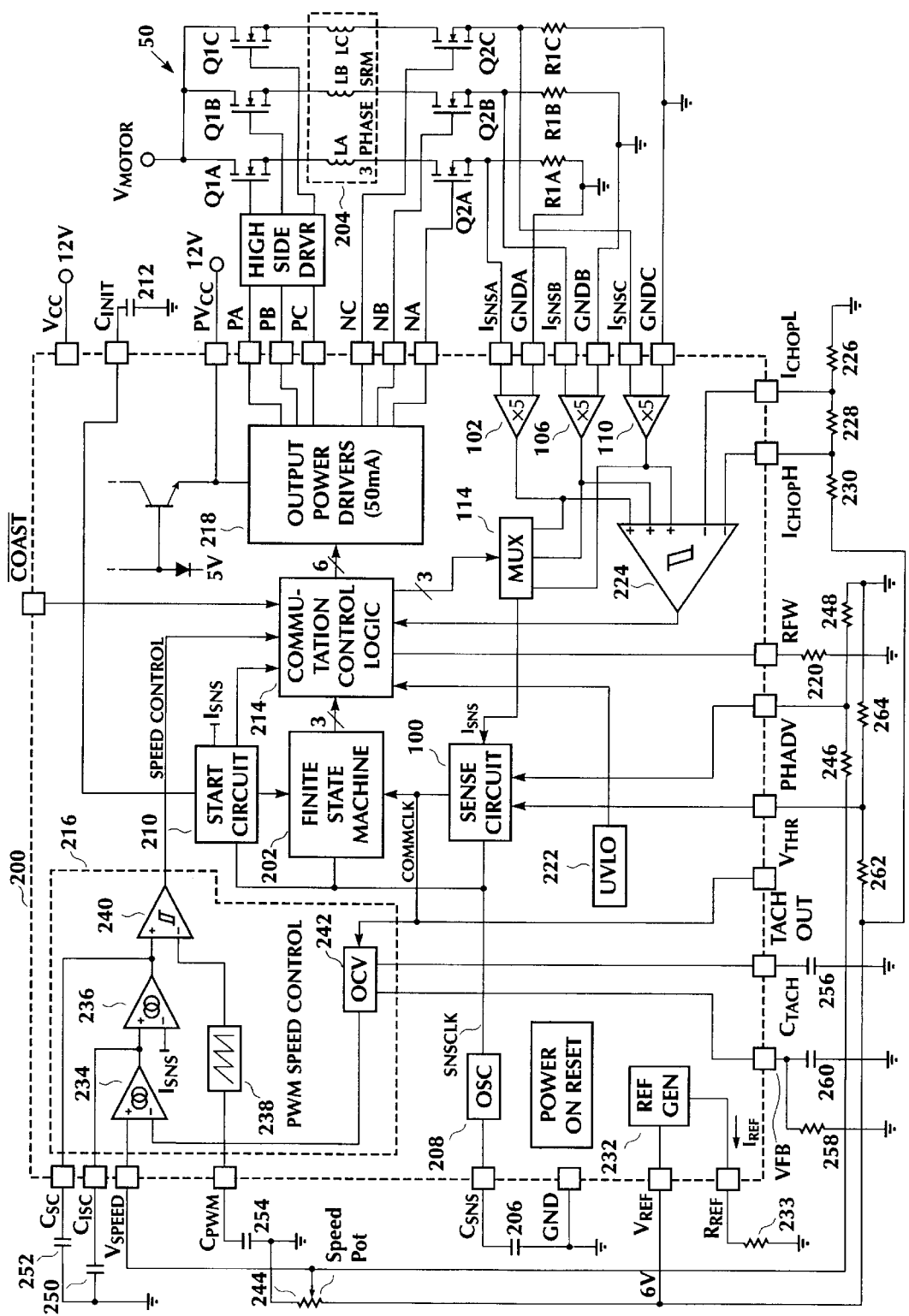
FIG. 7 illustrates a schematic block diagram of a controller circuit according to the present invention for driving a switched reluctance motor.

FIG. 7 illustrates a schematic block diagram of a controller circuit 200 according to the present invention for driving a switched reluctance motor 204. The controller circuit 200 is preferably an integrated circuit which is expected to be available under the Part Number ML4460 from Micro Linear Corporation, located at 2092 Concourse Drive, in San Jose, Calif.

A first terminal of a capacitor 206 is coupled to a ground node. A second terminal of the capacitor 206 is coupled to an oscillator 208 via a terminal CSNS of the controller for setting the oscillation frequency of the oscillator 208. The oscillator 208 provides the clock signal SNSCLK to the sense circuit 100 (also illustrated in FIG. 6), to the finite state machine 202 and to a start circuit 210. A first terminal of a capacitor 212 is coupled to the ground node. A second terminal of the capacitor 212 is coupled to CINIT terminal of the controller 200 and to the start circuit 210. The capacitor CINIT sets timing for the excitation voltages applied to the motor 204 under control of the start circuit 210. The start circuit 210 is coupled to the finite state machine 202 and to a commutation control logic circuit 214 for controlling excitation voltages applied to the motor 204 for starting the motor 204 from rest. Once the motor 204 begins turning, the sense circuit 100 takes over control.

The sense circuit 100 is coupled to provide the clock signal COMMCLK to the finite state machine 202, to a speed control circuit 216 and to a TACH OUT terminal of the controller 200. The finite state machine 202 provides three control signals to the commutation control logic block 214. The three control signals, one for each phase of the motor 204, indicate at appropriate times that the commutation control logic block 214 is to control commutation from one phase to another. The commutation control logic block 214 provides six control signals, one for each of the transistors Q1A, Q2A, Q1B, Q2B, Q1C and Q2C of the inverter 50 (also illustrated in FIG. 2), to an output power driver block 218. The output power driver block 218 is, in turn, coupled to the control terminals PA, PB, PC, NA, NB, NC of the power inverter 50. The commutation control logic block 214 also provides the control signals STATE A, STATE B and STATE C to the multiplexer 114 (also illustrated in FIG. 6).

The commutation control logic block 214 is coupled to receive a speed control signal from the speed control block 216 for controlling the speed of the motor in a feedback loop. The commutation control logic block 214 is also coupled to receive a coast control signal from a terminal $\overline{COAST}$ of the controller 200. The coast control signal selectively coasts the motor 204 by causing the commutation control logic block 214 to inhibit the excitation voltages applied to the field windings LA, LB and LC of the motor 204. The commutation control logic block 214 is also coupled to receive a reverse/forward control signal control from a terminal RFW of the controller 200. The forward/reverse signal controls a direction of rotation of the motor 204 by causing the commutation control logic block 214 to reverse the order in which the phases of the motor 204 are driven (and sensed). For rotation in a single direction, a first terminal of a resistor 220 is coupled to the terminal RFW. A second terminal of the resistor 220 is coupled to the ground node. An under voltage lock-out (UVLO) block 222 is also coupled to the commutation control logic block 214 for inhibiting the commutation control logic block 214 from applying excitation voltages to the motor 204 in the event that an under-voltage condition exists.

Each of the outputs of the amplifiers 102, 106, 110 (also illustrated in FIG. 6) are coupled to respective non-inverting inputs of a hysteretic comparator 224. A first inverting input of the comparator 224 is coupled, via a terminal ICHOPL of the controller 200, to a first terminal of a resistor 226 and to a first terminal of a resistor 228. A second terminal of the resistor 226 is coupled to the ground node. A second terminal of the resistor 228 is coupled to a first terminal of a resistor 230, and to a second inverting input of the comparator 224, via a terminal ICHOPH of the controller 200. A second terminal of the resistor 230 is coupled to reference generator 232 via a VREF terminal of the controller 100. An output of the comparator 224 is coupled to the commutation control logic block 214.

When one of the current sense signals ISNSA, ISNSB or ISNSC becomes excessive such that the voltage at the ICHOPH terminal of the controller 200 is exceeded, the comparator 224 inhibits the commutation control logic block 214 from applying excitation voltages to the motor 204 until the current sense signals fall below the voltage at the ICHOPL terminal of the controller 200 (e.g. by chopping the excitation voltages). This prevents currents in the field windings LA, LB and LC from becoming excessive.

The reference generator 232 preferably forms a 6 volt dc reference voltage from a 12 volt dc supply voltage coupled to the controller 200. The level of a reference current IREF formed by the reference generator 232 is set by a resistor 233 having a first terminal coupled to the reference generator via an RREF terminal of the controller 200. A second terminal of the resistor RREF is coupled to the ground node.

The speed controller 216 includes transconductance amplifiers 234, 236, a ramp generator 238, an hysteretic comparator 240 and an oscillator controlled voltage (OCV) source 242. The OCV 242 receives the signal COMMCLK and provides a signal to an inverting input of the transconductance amplifier 234 that is representative of the actual motor speed. A non-inverting input of the transconductance amplifier 234 is coupled to receive a voltage signal that is representative of a desired motor speed from a terminal VSPEED of the controller 200. A first terminal of a potentiometer 244 is coupled to the reference voltage generator 232 via the terminal VREF. A second terminal of the potentiometer 244 is coupled to the ground node. The terminal VSPEED is coupled to a wiper of the potentiometer 244. Thus, the speed of the motor 204 is controlled by the potentiometer 244. It will be apparent that the motor speed can be controlled by a circuit other than a potentiometer that supplies a voltage representative of the desired speed for the motor 204.

The wiper of the potentiometer 244 is also coupled to a first terminal of a resistor 246. A second terminal of the resistor 246 is coupled to a terminal PHADV of the controller 200 and to a first terminal of a resistor 248. A second terminal of the resistor 248 is coupled to the ground node. The terminal PHADV of the controller 200 is coupled to provide the offset voltage Vos to the comparator CMP2 (FIG. 6) of the sense circuit 100. A voltage applied to the terminal PHADV of the controller 200 is proportional to the voltage applied to the terminal VSPEED of the controller, thus, the phase advance is controlled to be proportional to the desired motor speed. Alternately, the voltage applied to the terminal PHADV is derived from the VFB output of the controller 200, so as to provide an offset voltage Vos that is proportional to the actual speed of the motor. In addition, it will be apparent that other circuits can provide the offset voltage Vos.

An output of the transconductance amplifier 234 is coupled to a terminal CISC of the controller 200 and to a non-inverting input of the transconductance amplifier 236. An inverting input of the transconductance amplifier 236 is coupled to receive the signal ISNS. The terminal CISC of the controller is coupled to a first terminal of a capacitor 250. A second terminal of the capacitor 250 is coupled to the ground node. The transconductance amplifier 234 produces an error current representative of a difference between the actual speed of the motor and the desired speed. The error current develops a voltage across the capacitor 250 which is a mathematical integration of the error current over time. The voltage signal across the capacitor 250 is representative of a level of motor current required (in the field winding LA, LB, LC being driven) for eliminating the speed error. The voltage signal across the capacitor 250 is compared to the signal ISNS by the transconductance amplifier 236. The signal ISNS is representative of the actual current in the field winding LA, LB, LC being driven.

Thus, the output current produced by the transconductance amplifier 236 is representative of a change to the field winding current required for maintaining the desired motor speed. The output of the transconductance amplifier 236 is coupled to a terminal CSC of the controller 200 and to a non-inverting input of a hysteretic comparator 240. The terminal CSC of the controller 200 is coupled to a first terminal of a capacitor 252. A second terminal of the capacitor 252 is coupled to the ground node. The output current produced by the transconductance amplifier 236 develops a voltage across the capacitor 252 which is compared to a periodic ramp signal produced by the ramp signal generator 238. The output of the comparator 240 is utilized by the commutation control logic block 216 for modulating the excitation voltages applied to the field winding LA, LB, LC being driven (e.g. pulse-width modulation). Thus, the level of current in the field windings LA, LB, LC, during respective drive states is controlled for controlling the speed of the motor 204 in a feedback loop.

The ramp generator 238 is also coupled to a first terminal of a capacitor 254 via a terminal CPWM of the controller 200. A second terminal of the capacitor 254 is coupled to the ground node. The capacitor 254 sets the frequency of the periodic ramp signal. The OCV 242 of the speed controller 216 is coupled to a first terminal of a capacitor 256 via a terminal CTACH of the controller 200. A second terminal of the capacitor 256 is coupled to the ground node. The capacitor 256 provides a time constant for the OCV 242 for converting the clock signal COMMCLK to a voltage level. The OCV 242 is also coupled via a terminal VFB of the controller 200 to a first terminal of a resistor 258 and to a first terminal of a capacitor 260. A second terminal of the resistor 258 and a second terminal of the capacitor 260 are coupled to the ground node. The terminal VFB provides a voltage level representative of the actual speed of the motor 204.

A first terminal of a resistor 262 is coupled to the reference generator 232 via the terminal VREF of the controller 200. A second terminal of the resistor 262 is coupled to the VTHR terminal of the comparator CMP1 of the sense circuit 100 (FIG. 6), via a terminal VTHR of the controller 200, and to first terminal of a resistor 264. A second terminal of the resistor 264 is coupled to the ground node. The resistors 262 and 264 set the threshold level VTHR for the comparator CMP1.

Figure 8:
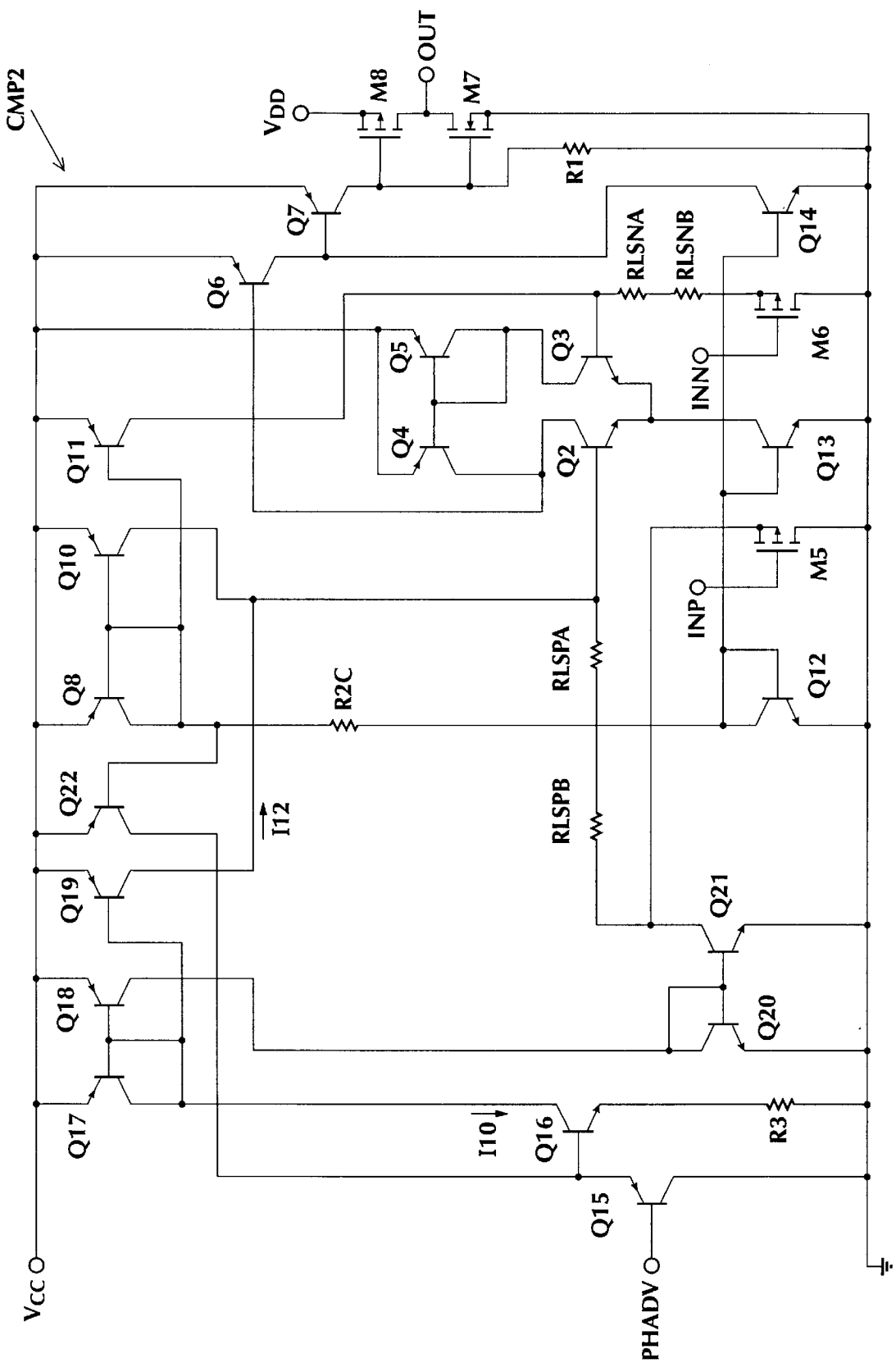
FIG. 8 illustrates a schematic diagram of the comparator CMP2 illustrated in FIG. 6.

FIG. 8 illustrates a schematic diagram of the comparator CMP2 illustrated in FIG. 6. A supply voltage VCC is coupled to emitters of pnp bipolar transistors Q4, Q5, Q6, Q7, Q8, Q10, Q11, Q17, Q18, Q19 and Q22. Bases of the transistors Q17, Q18 and Q19 are coupled to a collector of a transistor Q17 and to collector of an npn bipolar transistor Q16. A collector of the transistor Q22 is coupled to a base of the transistor Q16 and to an emitter of a pnp bipolar transistor Q15. A base of the transistor Q15 is coupled to a terminal PHADV of the comparator CMP2. An emitter of the transistor Q16 is coupled to a first terminal of a resistor R3. A collector of the transistor Q18 is coupled to a collector of an npn bipolar transistor Q20, to a base of the transistor Q20 and to a base of an npn bipolar transistor Q21.

A collector of the transistor Q19 is coupled to a collector of the transistor Q10, to a base of an npn bipolar transistor Q2 and to a first terminal of a resistor RLSPA. A collector of the transistor Q8 is coupled to a base of the transistor Q8, to a base of the transistor Q22, to a base of the transistor Q10, to a base of the transistor Q11 and to a first terminal of a resistor R2C. A second terminal of the resistor RLSPA is coupled to a first terminal of a resistor RLSPB. A second terminal of the resistor RLSPB is coupled to a source of a PMOSFET M5 and to a collector of a transistor Q21. A gate of the transistor M5 is coupled to a terminal INP of the comparator CMP2. A second terminal of the resistor R2C is coupled to a collector of an npn bipolar transistor Q12, to a base of the transistor Q12, to a base of an npn bipolar transistor Q13 and to a base of an npn bipolar transistor Q14.

A collector of the transistor Q11 is coupled to a base of an npn bipolar transistor Q3 and to a first terminal of a resistor RLSNA. A second terminal of the resistor RLSNA is coupled to a first terminal of a resistor RLSNB. A second terminal of the resistor RLSNB is coupled to a source of a PMOSFET M6. A gate of the transistor M6 is coupled to a terminal INN of the comparator CMP2. A collector of the transistor Q4 is coupled to collector of the transistor Q2 and to a base of the transistor Q6. A base of the transistor Q4 is coupled to a base of the transistor Q5, to a collector of the transistor Q5 and to a collector of the transistor Q3. An emitter of the transistor Q2 is coupled to an emitter of the transistor Q3 and to a collector of the transistor Q13.

A collector of a transistor Q6 is coupled to a base of the transistor Q7 and to a collector of the transistor Q14. A collector of the transistor Q7 is coupled to a first terminal of a resistor R1, to a gate of a PMOSFET M8 and to a gate of an NMOSFET M7. A supply voltage VDD is coupled to a source of the transistor M8. A drain of the transistor M8 is coupled to a drain of the transistor M7 and to an output terminal OUT. A source of the transistor M7, a second terminal of the resistor R1, an emitter of the transistor Q14, a drain of the transistor M6, an emitter of the transistor Q13, a drain of the transistor M5, an emitter of the transistor Q12, an emitter of the transistor Q21, an emitter of the transistor Q20, a second terminal of the resistor R3 and a collector of the transistor Q15 are coupled to a ground node.

The terminal INP provides a non-inverting input terminal of the comparator CMP2 while the terminal INN provides an inverting input terminal of the comparator CMP2. The terminal OUT provides an output terminal of the comparator CMP2. The terminal PHADV provides an offset input of the comparator. When the terminal PHADV is at ground level, the comparator CMP2 compares the voltage levels of the terminals INP and INN directly for controlling the logic level of the output terminal OUT.

When a voltage is applied to the terminal PHADV, this applied voltage appears across the resistor R3 (plus the emitter-base voltage of Q15 and minus the base-emitter voltage of Q16). As a result, a current I10, proportional to the voltage level applied to the terminal PHADV, is drawn from the transistor Q16 through the resistor R3. The current I10 is mirrored by a current I12 supplied by the transistor Q19 to the resistors RLSPA and RLSPB. The current I12 causes a voltage drop across the resistors RLSPA and RLSPB. This voltage drop results in an offset of the input terminal INP relative to the input terminal INN, thus, providing the offset required for adjusting the phase advance for driving the motor. As illustrated in FIG. 7, the offset is preferably proportional to the motor speed.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, current levels, and voltage levels disclosed herein.

What is claimed is:

1. A method of sensing a position of a rotor of a switched reluctance method and for appropriately commutating the motor in response to the position of the rotor, the method comprising:

a) applying a first voltage pulse to a first phase of the motor;

b) storing a value representative of a current produced in response to the first voltage pulse thereby forming a stored value;

c) after the step of storing, applying a series of one or more additional voltage pulses to the first phase of the motor for producing a series of values representative of corresponding current pulses;

d) comparing each of the series of values to the stored value; and e) after one of the series of values is below the stored value by at least an offset, providing a commutation signal.

2. The method according to claim 1 further comprising a step of driving a second phase of the motor while performing the steps a–e.

3. The method according to claim 2 further comprising a step of commutating the motor in response to the commutation signal wherein the step of commutating the motor includes a step of inhibiting the step of driving the second phase of the motor and a step of driving the first phase of the motor.

4. The method according to claim 1 wherein the stored value is updated for each commutation of the motor.

5. The method according to claim 1 wherein the stored value is a voltage level stored by a capacitor.

6. The method according to claim 5 wherein the step of comparing each of the series of values to the stored value is performed by a comparator coupled to the capacitor.

7. The method according to claim 6 wherein the offset is adjusted by applying an adjustable voltage to a control input of the comparator.

8. The method according to claim 1 wherein the offset is proportional to the speed of the motor.

9. The method according to claim 1 further comprising a step of controlling a speed of the motor in a feedback loop.

10. The method according to claim 9 wherein the offset is adjusted according to a desired speed of the motor.

11. The method according to claim 9 wherein the offset is adjusted according to a measured speed of the motor.

12. A method of sensing a position of a rotor of a switched reluctance motor and for appropriately commutating the motor in response to the position of the rotor, the method comprising:

a) applying a first voltage pulse to a first phase of the motor;

b) storing a value representative of a current produced in response to the first voltage pulse thereby forming a stored value;

c) after the step of storing, applying a first series of one or more additional voltage pulses to the first phase of the motor for producing a first series of values representative of corresponding current pulses;

d) comparing each of the first series of values to a predetermined threshold;

e) after one of the first series of values exceeds the predetermined threshold, applying a second series of one or more additional voltage pulses to the first phase of the motor for producing a second series of values representative of corresponding current pulses;

f) comparing each of the second series of values to the stored value; and g) after one of the second series of values is below the stored value by at least an offset, providing a commutation signal.

13. The method according to claim 12 further comprising a step of driving a second phase of the motor while performing the steps a–g.

14. The method according to claim 13 further comprising a step of commutating the motor in response to the commutation signal wherein the step of commutating the motor includes a step of inhibiting the step of driving the second phase of the motor and a step of driving the first phase of the motor.

15. The method according to claim 12 wherein the stored value is updated for each commutation of the motor.

16. The method according to claim 14 further comprising a step of modulating drive signals applied during the step of driving the first phase and during the step of driving the second phase for controlling a speed of the motor.

17. The method according to claim 12 wherein the stored value is a voltage level stored by a capacitor.

18. The method according to claim 17 wherein the step of comparing each of the second series of values to the stored value is performed by a comparator coupled to the capacitor.

19. The method according to claim 18 wherein the offset is adjusted by applying an adjustable voltage to a control input of the comparator.

20. The method according to claim 12 wherein the offset is proportional to the speed of the motor.

21. The method according to claim 12 further comprising a step of controlling a speed of the motor in a feedback loop.

22. The method according to claim 21 wherein the offset is adjusted according to a desired speed of the motor.

23. The method according to claim 21 wherein the offset is adjusted according to a measured speed of the motor.

24. An apparatus for driving a switched reluctance motor, the apparatus comprising:
   a) a sensing circuit for forming sensing signals, one sensing, signal corresponding to each phase of the motor, wherein each of the sensing signals is representative of an inductance of the corresponding phase at selected intervals;
   b) a selecting circuit coupled to the sensing circuit, the selecting circuit for selecting one of the sensing signals wherein the inductance of the phase corresponding to the selected one of the sensing signals has an initial value after a first commutation of the motor, falls to a minimum value and then rises again;
   c) a storing circuit coupled to the selecting circuit, the storing circuit for storing the initial value, thereby forming a stored value; and
   d) a determining circuit coupled to the storing circuit, the determining circuit for determining when the inductance rises to a value that is approximately equal to the stored value less an offset after having reached the minimum value and when the inductance rises to the value that is approximately equal to the stored value less the offset, initiating a second commutation of the motor.

25. The apparatus according to claim 24 wherein the selected one of the sensing signal is formed in response to a series of voltage pulses applied to the corresponding phase between the first commutation and the second commutation.

26. The apparatus according to claim 25 wherein the offset determines a phase advance for the second commutation of the motor.

27. The apparatus according to claim 26 wherein the speed of the motor is controlled in a feedback loop.

28. The apparatus according to claim 27 wherein the offset is adjusted according to a desired speed of the motor.

29. The apparatus according to claim 27 wherein the offset is adjusted according to an actual speed of the motor.

30. An apparatus for driving a switched reluctance motor, the apparatus comprising:
   a) a sensing circuit for sensing a current in each phase of the motor;
   b) a finite state machine for providing a signal indicative of a phase of the motor to be sensed;
   c) a selecting circuit for selecting a phase to be sensed by the sensing circuit, wherein the selecting circuit is coupled to the sensing circuit and to the finite state machine;
   d) a storage circuit for storing a first value representative of an inductance of the phase to be sensed during a first interval, the storage circuit coupled to the selecting circuit;
   e) a first comparing circuit for comparing a threshold to a second value representative of an inductance of the phase to be sensed during a second interval, the first comparing circuit coupled to the selecting circuit; and
   f) a second comparing circuit for comparing the first value to a third value representative of an inductance of the phase to be sensed during a third interval wherein the second comparing circuit is coupled to the selecting circuit and wherein the second comparing circuit is enabled by the first comparing circuit and wherein the second comparing circuit enables the finite state machine for indicating a next phase of the motor to be sensed.

31. The apparatus according to claim 30 wherein the second comparing circuit includes an adjustable offset for comparing the first value to the third value and wherein the offset determines an amount of phase advance for the motor.

32. The apparatus according to claim 30 wherein the finite state machine also indicates a phase of the motor to be driven.

33. The apparatus according to claim 30 wherein the sensing circuit is coupled to receive currents from each of the phases and wherein the sensing circuit forms a sensing signal for each phase.

34. The apparatus according to claim 33 wherein the selecting circuit is a multiplexer coupled to receive each sensing signal and wherein the finite state machine controls the multiplexer for providing a selected one of the sensing signals to the first and second comparing circuits.

35. The apparatus according to claim 33 wherein each sensing signal is filtered by a low pass filter before being coupled to the selecting circuit.

36. The apparatus for sensing a position of a rotor of a switched reluctance motor and for appropriately commutating the motor in response thereto, the apparatus comprising:
   a) a plurality of coils, each having an inductance;
   b) means for selectively and sequentially driving the coils for turning the rotor;
   c) means for sensing the inductance of a coil that is not being driven; and
   d) means for commutating from driving one coil to another upon sensing a predetermined change in the inductance.

37. A method of sensing a position of a rotor of a switched reluctance motor and for appropriately commutating the motor in response to the position of the rotor, the method comprising:
   a) applying a first voltage pulse to a first phase of the motor;
   b) storing a value representative of a current produced in response to the first voltage pulse thereby forming a stored value;
   c) after the step of storing, applying a series of one or more additional voltage pulses to the first phase of the motor for producing a series of values representative of corresponding current pulses;

d) comparing each of the series of values to the stored value; and e) after one of the series of values is below the stored value, providing a commutation signal.

38. The method according to claim 37 wherein the stored value is updated for each commutation of the motor.

39. A method of sensing a position of a rotor of a switched reluctance motor and for appropriately commutating the motor in response to the position of the rotor, the method comprising:

a) applying a first voltage pulse to a first phase of the motor;

b) storing a value representative of a current produced in response to the first voltage pulse thereby forming a stored value;

c) after the step of storing, applying a first series of one or more additional voltage pulses to the first phase of the motor for producing a first series of values representative of corresponding current pulses;

d) comparing each of the first series of values to a predetermined threshold;

e) after one of the first series of values exceeds the predetermined threshold, applying a second series of one or more additional voltage pulses to the first phase of the motor for producing a second series of values representative of corresponding current pulses;

f) comparing each of the second series of values to the stored value; and g) after one of the second series of values is below the stored value, providing a commutation signal.

40. The method according to claim 39 wherein the stored value is updated for each commutation of the motor.

* * * * *

UNITED STATES PATENT AND TRADEMARK OFFICE
CERTIFICATE OF CORRECTION

PATENT NO. : 5,859,518
DATED : January 12, 1999
INVENTOR(S) : Mark Vitunic

It is certified that error appears in the above-identified patent and that said Letters Patent is hereby corrected as shown below:

On the title page, item [56],
IN THE REFERENCES CITED:

| Insert -- | 5,783,916 | 8/1998 | Blackburn | 318/701 |
| | 5,627,444 | 5/1997 | Fulks | 318/701 |
| | 5,525,887 | 6/1996 | Van Sistine | 318/701 |
| | 5,196,775 | 3/1993 | Harris et al. | 318/638--. |

Signed and Sealed this

Fourth Day of May, 1999

Attest:

Q. TODD DICKINSON

*Attesting Officer*   Acting Commissioner of Patents and Trademarks